Patented Oct. 18, 1932

1,882,976

UNITED STATES PATENT OFFICE

OTTO SCHMIDT AND GEORG NIEMANN, OF LUDWIGSHAFEN-ON-THE-RHINE, AND EGON MEYER, OF MANNHEIM, GERMANY, ASSIGNORS TO I. G. FARBENINDUSTRIE AKTIEN-GESELLSCHAFT, OF FRANKFORT-ON-THE-MAIN, GERMANY, A CORPORATION OF GERMANY

PRODUCTION OF CONVERSION PRODUCTS OF SYNTHETIC RUBBER

No Drawing. Application filed June 3, 1929, Serial No. 368,181, and in Germany June 15, 1928.

In the application for patent Ser. No. 360,615 filed May 4, 1929, one of the present inventors together with others has described a process for the production of artificial masses from a non-distillable polymerization product or the non-distillable intermediate products, obtainable from butadiene or its substitution products in which the 1- or 1.4-positions of the butadiene have been substituted with hydrocarbon radicles.

We have now found that valuable products applicable to numerous technical purposes, are obtained by heating with or without the application of pressure, the non-distillable polymerization products, which term includes also the non-distillable intermediate products of butadiene or its substitution products in which the 1-position of the butadiene radicle has been substituted with hydrocarbon radicles in the presence of smaller amounts of a sulphurizing agent than are required for the production of hard rubber from india rubber, and in the presence or absence of other substances. These hydrocarbons will hereinafter be referred to as "a butadiene". The sulphur may be employed in the form of sulphur chloride, sulphur thiocyanate, polysulphides and the like, instead of in the free state and the quantity of sulphur employed is generally about 5 per cent by weight of that of the polymerization product employed or less. According to this manner of working solid products analogous to the products known in the trade under the registered trade mark "bakelite" can be obtained.

The temperature employed is, generally speaking, about between 100° and 500° C. depending on the nature of the polymerization product and the period of working chosen and of the products desired. Usually the main heating temperature is between 200° and about 400° C. though, in the commencement of the process it is sometimes advisable to start with a lower temperature. It is to be understood that the said upper limits of temperature may relate to the temperature of the material itself and not only to the surrounding atmosphere and that they depend on the duration of the treatment.

The products prepared by heating under strenuous conditions or for a protracted period with sulphur are, generally speaking, insoluble in any of the usual solvents, of high resistance to fracture and tension, and of considerable hardness. They offer a very high resistance to chemical agents and are almost completely insensitive to rises of temperature. Their electrical conductivity is very low, so that they are admirably suitable as insulating materials. Being easily obtained in a colorless and transparent, or translucent, condition, they are also very suitable for the production of artificial articles, including large moulded articles.

It is also possible, with the aid of the products herein described, to produce coatings of all kinds on any convenient foundations, by applying the polymerization products or the intermediate products, preferably in solution to the article to be coated, the latter being then treated in the aforesaid manner.

In this manner, a tough and strongly adherent lacquer coating, distinguished by unusual elasticity and hardness, is obtained, for example from butadiene. The hardness is often many times as great as that of ordinary lacquer coatings, and as a rule the coatings cannot be scratched at all by objects of medium hardness. The resistance to the influence of temperature and chemical agents being also extremely high, the quality of these coatings is considerably superior to that of most of those already known. By pouring the solutions on highly polished surfaces, such as glass and the like, and subjecting them to the aforesaid heat treatment films can be obtained which after removal from the surface may be employed for the most different purposes. On account of their being thoroughly transparent, of being easily dyed or colored, for example by means of leaf gold and of being quite unhygroscopic, they may find useful application for vehicle windows, such as in motor-cars, or for mouth pieces, for example for cigarettes and the like.

Particularly valuable products are obtained when the initial solutions are subjected to a very far reaching purification before their employment. This effect can be obtained by subjecting the solutions to sedimentation, centrifuging, intense filtration or to a combination of several of these steps.

The coatings may be produced, for example by introducing coatings prepared, in the usual manner, with solutions of the polymerization products, into an atmosphere of sulphur chloride, or dipping them into a highly diluted solution of sulphur chloride in a suitable solvent, such as benzene or carbon tetrachloride and then hardening them by the aid of heat. The hardening may also be performed in the presence of accelerators, such as vulcanization accelerators. Under certain circumstances it is also advisable to add oxidation retarders to the solutions and other substances, such as platicizer, coloring agents and the like, may be mixed with the solutions employed for preparing the coatings. Hardening at an elevated temperature is preferably performed in an atmosphere free from oxygen, such as an atmosphere of hydrogen, steam, nitrogen or carbon dioxide.

The presenet process allows of producing similar artificial masses as are described in the application Ser. No. 360,615 filed May 4, 1929.

The coatings and artificial objects obtained in the manner herein described are admirably suitable, by reason of their lower content thereof compared with hard rubber, for numerous purposes, especially those of insulation. For example, according to this process, mica plates can be very firmly cemented together and thereby furnish extremely stable insulating materials, resisting perforation. The compositions so obtained are also suitable, owing to their absence of color and their high adhesive properties, for cementing sheets of glass in making non-splintering glass, or for cementing lenses and the like. In contrast to the glyptal resins already known, which are largely used for these purposes, but which cannot be hardened when in the state of thin layers between other substances, as for example mica plates, there is no difficulty in hardening the above described compositions, even under these conditions. It is also possible according to the process herein described to make artificial objects which are only superficially sulphurized, by exposing them to the action of the sulphur bearing agent for only a short time.

The production of the said polymerization products, or of the products obtained in the antecedent stages can also be effected by heating under elevated or reduced pressure and/or in the presence of a hydrocarbon such as cyclohexane or butylene. There is no need to start with the finished polymerization products, on the contrary, lower, but non-distillable polymerization products, may also be employed as the initial substances. Such products can be obtained, for example, by prematurely interrupting the polymerization of the butadiene and the like, or by employing retarding agents in the polymerizing process. By carrying out the heating at lower temperatures or for a shorter period, products can be obtained which are less hard and insoluble than those above described. Use may also be made in the present process of solvents and/or other additions, such as plasticizers, such as aryl-phosphates, petroleum jelly, waxes, high boiling oils and the like or also india rubber or polymerization products of isomers of butadiene or of its aforesaid substitution products, for example isoprene. Since india rubber is assumed to be a natural polymerization product of isoprene all these products will be referred to as polymerization products of other diolefines, and fillers, such as barium sulphate, asbestos, and the like, or, in some cases, animal or vegetable fibrous materials, and the like may be added and also coloring agents, if desired. By modifying the amount of the additional substance and the sulphur, it is also possible to vary the mechanical properties and in particular the hardness of the products within wide limits.

The following examples will further illustrate the nature of the said invention, but the invention is not restricted to these examples. The parts are by weight.

*Example 1*

A 5 per cent solution in benzene of a polymerization product prepared from butadiene by means of sodium is applied to a clean metallic surface, the benzene being then allowed to evaporate. The film remaining on the foundation is exposed to the vapor of sulphur monochlorid, or dipped into a 0.5 per cent solution of the said chloride. On heating the film at 180° C. for an hour, air being excluded, an almost colorless coating is obtained, which adheres firmly to the base and is distinguished by great hardness, and resistance to heat and chemical agents.

*Example 2*

A mixture of 100 parts of a polymerization product prepared from butadiene by means of sodium, 2 parts of sulphur and 1 part of diphenylguanidine is heated at 250° C. for 3 hours. A product resembling hard rubber and possessing excellent properties is obtained.

*Example 3*

A 25 per cent solution in cyclohexane of a polymerization product which has been prepared from butadiene by the action of sodium and been purified by filtration, treatment with an acid and subsequent drying is incorporated with from 2 to 3 per cent by weight of the polymerization product of sulphur dissolved in a little carbon disulphide. The mixture which is clear after thorough mixing is then pressed through a series of spinnng nozzles contained in a nozzle head from above into a vertically arranged pipe which is heated to temperatures increasing towards its bottom at which a temperature of 400° C., or even more, is maintained. The air within the pipe is preferably replaced by inert gases in order to avoid a combustion of the threads formed on passing the solution through the pipe. The threads arriving at the bottom of the pipe are completely dry, hardened, and smooth and glossy and are wound on bobbins, which may be rotated with a speed higher than that of the solution passing the nozzles so that a stretching effect may be obtained.

Particularly valuable products are obtained when the initial solutions are subjected to a very far reaching purification before their employment. This effect can be obtained by subjecting the solutions to sedimentation, centrifuging, intense filtration or to a combination of several of these steps. Thus, for example, the dilute solution of the polymerization product, for example in cyclohexane is left standing for a considerable time, whereupon the solution is separated from any particles precipitated and is centrifuged or filtered, for example through linen or felt. If a further purification is required, for example, when transparent foils or threads are to be produced by means of the solutions, any impurities can be removed by passing the solution through a series of wadding pads of cotton or glass wool, which purification can be further improved by passing the solutions through leather, porous stone or porcelain or fritted glass, in which latter cases passing the solutions is enhanced by the application of pressure. If desired, also cataphoresis can be employed.

Instead of a solution of the aforesaid polymerization product a solution of polymerization product prepared from a diolefine other than butadiene can be employed or of a polymerization product prepared in another manner, for example by polymerization in the presence of butylene or of cyclohexane, in a quantity about equal to that of the diolefine employed or less. The solutions may also contain additional substances, such as softening agents or agents which reduce the inflammability which properties are found both, for example, in tricresyl phosphate. If desired, the finished threads may be treated with tungstates or phospho-tungstates and weighted with these or other agents. When working in an atmosphere which is practically free from or poor in oxygen glossy colorless threads are obtained possessing a high strength.

The finished threads can be further hardened by heating, the conditions of working hereby furnishing different shades. By heating under mild conditions, for example at a low temperature, or for a very short time threads with a silvery lustre are obtained, whereas heating at a higher temperature or for a longer time provides the threads with a golden lustre. The temperature can be reduced in case the hardening is performed in an atmosphere containing a considerable percentage of oxygen.

The threads obtained can be prepared in any convenient size and degree of hardness and can be easily dyed and/or spun into yarns. The yarns possess about the same properties than those prepared in accordance with the aforesaid application and can be used for the same or other purposes. The yarns prepared by means of the aforesaid threads may also find useful application for covering wires for electrical purposes in the place of the hitherto employed covers of cotton or silk which are rather sensitive to all influences, or for the manufacture of filtering cloth and the like.

What we claim is:

1. The process for the production of artificial masses which comprises heating a non-distillable polymerization product of a butadiene to a temperature between about 100° and 500° C. in the presence of a sulphurizing agent in a quantity below that required for the production of hard rubber from india rubber until the product has lost the tensile elasticity of rubber.

2. The process for the production of artificial masses, which comprises heating a non-distillable polymerization product of a butadiene to a temperature between about 100° and 500° C. in the absence of oxygen but in the presence of a sulphurizing agent in a quantity below that required for the production of hard rubber from india rubber until the product has lost the tensile elasticity of rubber.

3. The process for the production of artificial masses, which comprises heating a mixture containing a non-distillable polymerization product of a butadiene and a plasticizing agent to a temperature between about 100° and 500 C. in the presence of a sulphurizing agent in a quantity below that required for the production of hard rubber from india rubber until the product has lost the tensile elasticity of rubber.

4. The process for the production of artificial masses, which comprises heating a non-distillable polymerization product of a butadiene conjointly with a non-distillable polymerization product of another dioefine to a temperature between about 100° and 500° C. in the presence of a sulphurizing agent in a quantity below that required for the production of hard rubber from india rubber until the product has lost the tensile elasticity of rubber.

5. The process for the production of artificial masses, which comprises heating a solution of a non-distillable polymerization product of a butadiene to a temperature between about 100° and 500° C. in the presence of a sulphurizing agent in a quantity below that required for the production of hard rubber from india rubber.

6. The process for the production of artificial masses, which comprises heating a solution of a non-distillable polymerization product of a butadiene to a temperature between about 100° and 500° C. in the absence of oxygen, but in the presence of a sulphurizing agent in a quantity below that required for the production of hard rubber from india rubber.

7. The process for the production of artificial masses, which comprises heating a solution of a non-distillable polymerization product of a butadiene and of a non-distillable polymerization product of another diolefine to a temperature between about 100° and 500° C. in the absence of oxygen, but in the presence of a sulphurizing agent in a quantity below that required for the production of hard rubber from india rubber.

8. The process for the production of artificial masses, which comprises heating a mixture comprising a non-distillable polymerization product of a butadiene and a filling material to a temperature between about 100° and 500° C. in the presence of a sulphurizing agent in a quantity below that required for the production of hard rubber from india rubber until the product has lost the tensile elasticity of rubber.

9. The process for the production of artificial silk which comprises heating a fine jet of a solution of a non-distillable polymerization product of a butadiene to a temperature between about 100° and 500° C. in the presence of a sulphurizing agent in a quantity below that required for the production of hard rubber from india rubber.

10. The process for the production of artificial silk, which comprises heating a fine jet of a solution of a non-distillable polymerization product of a butadiene and of another diolefine to a temperature between about 100° and 500° C. in the presence of a sulphurizing agent in a quantity below that required for the production of hard rubber from india rubber.

11. The process for the production of artificial silk, which comprises heating a fine jet of a solution of a nondistillable polymerization product of a butadiene to a temperature between about 100° and 500° C. in the absence of oxygen, but in the presence of a sulphurizing agent in a quantity below that required for the production of hard rubber from india rubber.

12. The process for the production of artificial silk, which comprises heating a fine jet of a solution of a nondistillable polymerization product of a butadiene and of another diolefine to a temperature between about 100° and 500° C. in the absence of oxygen, but in the presence of a sulphurizing agent in a quantity below that required for the production of hard rubber from india rubber.

13. The process for the production of artificial silk, which comprises heating a fine jet of a solution of a nondistillable polymerization product of a butadiene to a temperature between about 100° and 500° C. in the presence of a sulphurizing agent in a quantity below that required for the production of hard rubber from india rubber and further heating the product obtained to a temperature between about 100° and 450° C.

14. The process for the production of artificial silk, which comprises heating a fine jet of a solution of a nondistillable polymerization product of a butadiene to a temperature between about 100° and 500° C. in the absence of oxygen, but in the presence of a sulphurizing agent in a quantity below that required for the production of hard rubber from india rubber and further heating the product obtained to a temperature between about 100° and 450° C.

15. The process for the production of artificial silk, which comprises heating a fine jet of a solution of a nondistillable polymerization product of a butadiene, polymerized in the presence of another liquid hydrocarbon, to a temperature between about 100° and 500° C. in the presence of a sulphurizing agent in a quantity below that required for the production of hard rubber from india rubber.

16. As new articles of manufacture solid aritficial masses which are insoluble in practically all chemical agents and solvents, possess at the most a slight tensile elasticity and comprise a product obtainable by heating a non-distillable polymerization product of a butadiene to a temperature between about 100° and 500° C. in the presence of a sulphurizing agent in a quantity below that required for the production of hard rubber from india rubber until the product has lost the tensile elasticity of rubber.

17. As new articles of manufacture solid artificial masses which are insoluble in practically all chemical agents and solvents, possess at the most a slight tensile elasticity and comprise a product obtainable by heating a non-distillable polymerization product of butadiene in the presence of a sulphurizing agent in a quantity below that required for the production of hard rubber from india rubber until the product has lost the tensile elasticity of rubber.

18. As new articles of manufacture solid artificial masses which are insoluble in practically all chemical agents and solvents, possess at the most a slight tensile elasticity and comprise a product obtainable by heating a non-distillable polymerization product of a butadiene to a temperature between about 100° and 500° C. in the presence of a sulphurizing agent in a quantity below that required for the production of hard rubber from india rubber and a filler until the product has lost the tensile elasticity of rubber.

19. As new articles of manufacture from transparent to translucent pliable artificial masses which are insoluble in practically all chemical agents and solvents, possess at the most a slight tensile elasticity and comprise a product obtainable by heating a non-distillable polymerization product of a butadiene to a temperature between about 100° and 500° C. in the presence of a sulphurizing agent in a quantity below that required for the production of hard rubber from india rubber until the product has lost the tensile elasticity of rubber.

20. As new articles of manufacture transparent artificial masses of a thickness below 1 millimeter which are insoluble in practically all chemical agents and solvents, possess at the most a slight tensile elasticity and comprise a product obtainable by heating a non-distillable polymerization product of a butadiene to a temperature between about 100° and 500° C. in the presence of a sulphurizing agent in a quantity below that required for the production of hard rubber from india rubber until the product has lost the tensile elasticity of rubber.

21. As new articles of manufacture artificial threads which are insoluble in practically all chemical agents and solvents, possess at the most a slight tensile elasticity and comprise a product obtainable by heating a non-distillable polymerization product of a butadiene to a temperature between about 100° and 500° C. in the presence of a sulphurizing agent in a quantity below that required for the production of hard rubber from india rubber.

22. As new articles of manufacture artificial threads which are insoluble in practically all chemical agents and solvents, possess at the most a slight tensile elasticity and comprise a product obtainable by heating a non-distillable polymerization product of a butadiene and of a non-distillable polymerization product of another diolefine to a temperature between about 100° and 500° C. in the presence of a sulphurizing agent in a quantity below that required for the production of hard rubber from india rubber.

23. As new articles of manufacture fabrics containing artificial threads which are insoluble in practically all chemical agents and solvents, possess at the most a slight tensile elasticity and comprise a product obtainable by heating a non-distillable polymerization product of a butadiene to a temperature between about 100° and 500° C. in the presence of a sulphurizing agent in a quantity below that required for the production of hard rubber from india rubber.

24. As new articles of manufacture fabrics containing artificial threads which are insoluble in practically all chemical agents and solvents, possess at the most a slight tensile elasticity and comprise a product obtainable by heating a non-distillable polymerization product of a butadiene, polymerized in the presence of another liquid hydrocarbon, to a temperature between about 100° and 500° C. in the presence of a sulphurizing agent in a quantity below that required for the production of hard rubber from india rubber.

25. The process for the production of artificial masses which comprises heating a solution of a non-distillable polymerization product of a butadiene with about 2 to 5%, by weight, of a sulfurizing agent at elevated temperatures until the resulting product loses its rubber-like tensile elasticity.

26. The process for the production of artificial masses which comprises heating a solution of a non-distillable polymerization product of a butadiene with about 2 to 5%, by weight, of a sulfurizing agent at 100 to 500° C. until the resulting product loses its rubber-like tensile elasticity.

27. The process for the production of thin transparent films which comprises heating a non-distillable polymerization product of a butadiene, on a smooth surface, to a temperature between about 100 and 500° C. in the presence of a sulfurizing agent in a quantity below that required for the production of hard rubber from india rubber until the resulting product loses its rubber-like tensile elasticity.

28. The process for the production of thin transparent films which comprises heating, on a smooth surface, a solution of a non-distillable polymerization product of a butadiene to a temperature between about 100 and 500° C. in the presence of a sulfurizing agent in a quantity below that required for the production of hard rubber from india rubber until the resulting product loses its rubber-like tensile elasticity.

29. The process for the production of hard coatings which comprises applying a mixture of a non-distillable polymerization product of a butadiene and a sulfurizing agent to the object to be coated, the sulfurizing agent being present in a quantity below that required for the production of hard rubber from india rubber and heating the mixture to about 100 to 500° C. until the resulting product loses its rubber-like tensile elasticity.

30. As new articles of manufacture, thin transparent films which are insoluble in all chemical agents and solvents, possess, at the most, a slight elasticity and comprise a product obtainable by heating a non-distillable polymerization product of a butadiene in the presence of a sulfurizing agent in a quantity below that required for the production of hard rubber from india rubber until the resulting product loses its rubber-like tensile elasticity.

31. As new articles of manufacture, hard coatings which are insoluble in practically all chemical agents and solvents, possess, at the most, a slight elasticity and comprise a product obtainable by heating a non-distillable polymerization product of a butadiene to a temperature between about 100 and 500° C. in the presence of a sulfurizing agent in a quantity below that required for the production of hard rubber from india rubber until the resulting product loses its rubber-like tensile elasticity.

In testimony whereof we have hereunto set our hands.

OTTO SCHMIDT.
GEORG NIEMANN.
EGON MEYER.